(12) United States Patent
Turnbull et al.

(10) Patent No.: US 11,415,864 B2
(45) Date of Patent: Aug. 16, 2022

(54) CAMERA CONCEALMENT USING PHOTOCHROMICS

(71) Applicant: Gentex Corporation, Zeeland, MI (US)

(72) Inventors: Robert R. Turnbull, Holland, MI (US); Xiaoxu Niu, Holland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 352 days.

(21) Appl. No.: 16/597,259

(22) Filed: Oct. 9, 2019

(65) Prior Publication Data

US 2020/0110327 A1 Apr. 9, 2020

Related U.S. Application Data (60) Provisional application No. 62/743,311, filed on Oct. 9, 2018.

(51) Int. Cl.
| | |
|---|---|
| *G03B 11/04* | (2021.01) |
| *B60R 11/04* | (2006.01) |
| *G02B 5/23* | (2006.01) |
| *G02B 1/04* | (2006.01) |
| *B60R 11/00* | (2006.01) |

(52) U.S. Cl.
CPC ............ *G03B 11/041* (2013.01); *B60R 11/04* (2013.01); *G02B 5/23* (2013.01); *B60R 2011/0094* (2013.01); *G02B 1/04* (2013.01)

(58) Field of Classification Search
CPC ......... G03B 11/041; G02B 5/23; B60R 11/04; B60R 2011/0094
See application file for complete search history.

(56) References Cited

U.S. PATENT DOCUMENTS

| | | |
|---|---|---|
| 4,621,785 A | 11/1986 | Embra |
| 4,736,218 A | 4/1988 | Kutman |
| 5,121,200 A | 6/1992 | Choi |
| 5,418,567 A | 5/1995 | Boers et al. |
| 5,619,036 A | 4/1997 | Salvia et al. |
| 5,761,556 A | 6/1998 | Ichino |
| 6,333,759 B1 | 12/2001 | Mazzilli |
| 6,536,961 B1 | 3/2003 | Gillies |
| 6,580,373 B1 | 6/2003 | Ohashi |
| 6,911,997 B1 | 6/2005 | Okamoto et al. |

(Continued)

FOREIGN PATENT DOCUMENTS

| | | |
|---|---|---|
| EP | 1006486 A2 | 6/2000 |
| JP | 2017087931 A | 5/2017 |

(Continued)

*Primary Examiner* — Clayton E. LaBalle
*Assistant Examiner* — Diana Hancock
(74) *Attorney, Agent, or Firm* — Price Heneveld LLP; Brian James Brewer (57) ABSTRACT

A concealing device for an imager of a vehicle includes a photochromic lens cover with an external surface that is co-extensive with an adjacent portion of the vehicle and disposed proximate a lens of the imager. The photochromic lens cover is operable between a first condition wherein the photochromic lens cover is exposed to ultraviolet light and darkens to a transmissivity of less than 15% and a second condition wherein the photochromic lens cover includes a transmissivity of greater than 50%.

19 Claims, 8 Drawing Sheets

(56) References Cited

U.S. PATENT DOCUMENTS

| | | |
|---|---|---|
| 7,111,996 B2 | 9/2006 | Seger et al. |
| 7,245,207 B1 | 7/2007 | Dayan et al. |
| 7,355,629 B2 | 4/2008 | Lang et al. |
| 7,891,886 B2 | 2/2011 | Schuetz |
| 8,248,315 B2 | 8/2012 | Lindackers et al. |
| 8,444,329 B2 | 5/2013 | Nakamura et al. |
| 8,698,894 B2 | 4/2014 | Briggance |
| 9,470,828 B1* | 10/2016 | Apdalhaliem ........ B64C 1/1484 |
| 2006/0256459 A1 | 11/2006 | Izabel et al. |
| 2007/0236569 A1 | 10/2007 | Lin |
| 2009/0250533 A1 | 10/2009 | Akiyama et al. |
| 2010/0110192 A1 | 5/2010 | Johnston et al. |
| 2012/0162420 A1 | 6/2012 | Onishi |
| 2014/0253731 A1 | 9/2014 | Suman et al. |
| 2018/0003966 A1* | 1/2018 | Kilcher ................. G02F 1/0147 |
| 2018/0261912 A1* | 9/2018 | Mizuno ................... H01Q 1/32 |
| 2018/0284573 A1* | 10/2018 | Cammenga .......... G03B 11/041 |
| 2019/0346742 A1* | 11/2019 | Cammenga ....... G02F 1/133528 |

FOREIGN PATENT DOCUMENTS

| | | |
|---|---|---|
| KR | 100909368 B1 | 7/2009 |
| KR | 20110114092 A | 10/2011 |
| KR | 101343814 B1 | 12/2013 |
| RU | 32347 U1 | 9/2003 |
| WO | 2017201759 A1 | 11/2017 |

\* cited by examiner

CAMERA CONCEALMENT USING PHOTOCHROMICS

CROSS-REFERENCE TO RELATED APPLICATION

This application claims priority to and the benefit under 35 U.S.C. § 119(e) of U.S. Provisional Application No. 62/743,311, filed on Oct. 9, 2018, entitled "CAMERA CONCEALMENT USING PHOTOCHROMICS," the disclosure of which is hereby incorporated herein by reference in its entirety.

FIELD OF THE DISCLOSURE

The present disclosure generally relates to an imager module for a vehicle, and more particularly to an imager module that can be concealed within a housing of a vehicle through the use of photochromics.

SUMMARY OF THE DISCLOSURE

According to one aspect of the present disclosure, a concealing device for an imager of a vehicle includes a photochromic lens cover with an external surface that is co-extensive with an adjacent portion of the vehicle and disposed proximate a lens of the imager. The photochromic lens cover is operable between a first condition wherein the photochromic lens cover is exposed to ultraviolet light and darkens to a transmissivity of less than 15% and a second condition wherein the photochromic lens cover includes a transmissivity of greater than 50%.

According to another aspect of the present disclosure, an imager module for a vehicle includes an imager that has an imager lens. The imager is configured to collect image data from at least one of inside and outside of the vehicle. A photochromic lens cover is disposed proximate the imager lens and is operable between a first condition wherein the photochromic lens cover is in a darkened state and lessens perceived flicker associated with image data captured by the imager and provided on a display and a second condition wherein the photochromic lens cover includes a transmissivity of greater than 50%.

According to yet another aspect of the present disclosure, an imager module for a vehicle includes an imager that has an imager lens. The imager is configured to collect image data from at least one of inside and outside of the vehicle. A photochromic lens cover is disposed proximate the imager lens and includes a substrate with photochromic materials interspersed therein. The photochromic lens cover is operable between a first condition wherein the photochromic lens cover is in a darkened state and a second condition wherein the photochromic lens cover is in a substantially transmissive state.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to an imager module for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
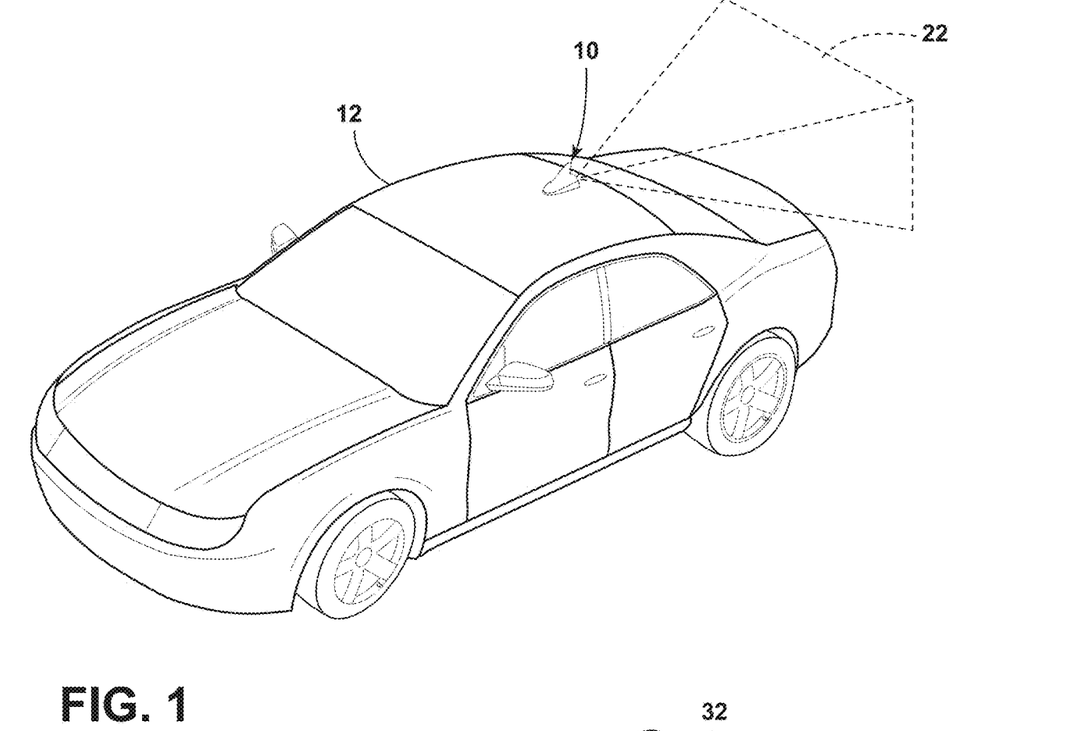
FIG. 1 is a top perspective view of one embodiment of a roof mounted antenna and imager module installed on a roof of a vehicle.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-15, reference numeral 10 generally designates an imager module for a vehicle 12. The imager module 10 includes an imager 14. The imager 14 includes an imager lens 16. The imager 14 is configured to collect image data 22 from at least one of inside and outside the vehicle 12. The imager 14 further includes a photochromic lens cover 20 disposed proximate the imager lens 16. The photochromic lens cover 20 is operable between a first condition wherein the photochromic lens cover 20 is in a darkened state and a second condition wherein the photochromic lens cover 20 is in a substantially transmissive state. The imager 14 is configured to capture image data for presentation on a display within the vehicle.

The use of imagers (including cameras, sensors, etc.) on vehicles (FIG. 1) is becoming more widespread in an effort to increase safety and provide additional functionality on these vehicles. The imagers may be exposed or concealed behind a generally transparent cover. Regardless, these imagers are not aesthetically pleasing to the consumer. Accordingly, ways to conceal the imagers, yet enable a full range of use for the imagers, is valuable. Vehicle manufacturers are utilizing more imagers than ever before in an effort to move the industry toward semiautonomous and fully autonomous vehicles. However, the appearance of the imagers, as noted above, can be unsightly. Moreover, to improve the life of the imagers, a cover should be positioned over the imager to protect the imager from damage, the elements, etc. The concepts set forth herein address concealability of the imager and creating aesthetically pleasing constructions. The constructions as set forth herein may be utilized as, or in conjunction with, vehicle windows including windshields, door windows, and sunroofs, and may also be used in conjunction with body panels or others features of the vehicle. Moreover, as set forth herein, the photochromic lens cover may be integrally formed as part of the body panel of the vehicle. As one non-limiting example, all or a portion of the photochromic lens cover may be integral with an antenna housing or center high mount stop lamp (CHMSL) housing. In this case, all or a portion of the photochromic lens cover that is part of the antenna housing or the CHMSL housing will lighten or darken as set forth in this application.

In an effort to conceal imagers from view, mechanical systems are frequently used. However, mechanical systems frequently require moving parts, which, over time, may result in wear and tear on static and moving parts of the system, resulting in failure of the mechanical system. An alternative is to utilize a photochromic device in the lens cover 20 that extends over the imager lens 16. The lens cover 20 will generally be configured to at least partially inhibit transmission of at least one of a visible spectrum of light. However, it is also contemplated that the lens cover 20 may inhibit transmission of an infrared spectrum of light or ultraviolet spectrum of light, depending on a given application. As set forth herein, the photochromic lens cover 20 may include microcrystalline silver halides, but may also include, or may alternatively include, photochromic quinones or inorganic photochromics.

With reference to FIGS. 3-7, the use of a photochromic glass as the lens cover 20 disposed proximate the imager lens 16 on the vehicle 12 may allow for concealment whenever ultraviolet light is present. The photochromic device that is formed in or on the lens cover 20 will generally allow sufficient light transmission for operation of the imager 14 during daylight hours even when the photochromic lens cover 20 is in a fully darkened condition. In one instance involving a 1.5 mm photochromic lens cover 20, it is generally contemplated that the glass will darken to less than 15% transmissivity, which allows for reasonable hiding of the imager 14 while still allowing for the imager 14 to function properly and capture image or video data through the photochromic lens cover 20. However, it is also understood that a photochromic lens cover 20 having a greater thickness (i.e., 3 mm) may include a lower transmission.

The transmissivity at the central portion of the photochromic lens cover 20 may be increased at the central portion of the lens cover 20 and have a lower degree of transmissivity at the periphery of the lens cover 20. When the photochromic lens cover 20 is not exposed to ultraviolet light (for example, during nighttime hours), the high end transmission of the photochromic lens cover 20 may be above 50% transmissivity. For example, it is generally contemplated that the transmissivity of the photochromic lens cover 20 may be approximately 90% when the photochromic lens cover 20 is not exposed to ultraviolet light. Upon exposure to ultraviolet light, it is contemplated that the transmissivity may be less than 20%, less than 10%, or even less than 5% depending on the exposure of ultraviolet light. It is also generally contemplated that the transmissivity may generally vary depending on the exposure of ultraviolet light, or may be configured to have a predetermined transmissivity based on a threshold exposure of ultraviolet light to the photochromic lens cover 20. More specifically, the photochromic lens cover 20 may include a particular density of microcrystalline silver halides that correspond to a predetermined desirable level of transmissivity based on a predetermined degree of ultraviolet light. It will also be understood that the density of the microcrystalline silver halides may vary across the photochromic lens cover 20. Accordingly, portions of the photochromic lens cover 20 may have a higher transmissivity than other portions of the photochromic lens cover 20 depending on the exposure of ultraviolet light to the photochromic lens cover 20. As an example, a higher density of microcrystalline silver halides may be present at a central location of the photochromic lens cover 20. As a result, the transmissivity upon exposure to ultraviolet light may be lower at a central portion of the photochromic lens cover 20, while a periphery of the photochromic lens cover 20 maintains a closer visible match to a window (or possibly a body panel) proximate the photochromic lens cover 20.

The photochromic lens cover 20 may generally include a uniform thickness and provide no substantial impact on optic qualities in the clear state. However, it is also contemplated that the photochromic material may be molded as a lens and could be part of the focusing optics used with the imager. In this instance, besides protecting the remainder of the imager 14, the photochromic lens cover 20 may provide desirable or enhanced optic qualities when used with the imager. Regardless of whether the photochromic lens cover 20 is used as a focusing optic, the photochromic lens cover 20 may be planar or have curvature in one or more directions across the photochromic lens cover 20.

Another aspect of the present disclosure includes the thickness of the photochromic lens cover 20 being thinner at the central portion of the photochromic lens cover 20 and thicker at a periphery of the photochromic lens cover 20. In this instance, the photochromic lens cover 20 may include a lensing effect that will impact the image data collected by the imager 14. This effect may be a desirable magnification of the image data. However, it is also contemplated that this effect on the image data may not be preferable and could be mitigated by a properly calibrated imager processing unit.

It is also contemplated that the glass may be generally tinted to substantially match a tint of an adjacent window of the vehicle 12. The aesthetics, such as color and/or reflectance, should be relatively stable over different viewing angles to blend well with the windows of the vehicle 12. The value of chroma, or the chromatic value, may be represented by C* units. In an L*C*h color space, C* is the distance from a lightness axis (L*) beginning at 0 in the center of a polar coordinate system and may represent an intensity, or purity, of color. The stability of C* with angle may be defined by the formula:

$$\Delta C^* = \sqrt{(a^*_0 - a^*_1)^2 + (b^*_0 - b^*_1)^2}$$

where $a^*_0$ and $b^*_0$ represent a first, or initial, angle of viewing and $a^*_1$ and $b^*_1$ represent a second angle. In some examples, the $\Delta C^*$ may be stable such that $\Delta C^*$ is approximately constant between two zones, which may include the field of view through the photochromic lens cover 20 and a perimeter portion of the lens cover 20 proximate the vehicle body panel or window, as the angle shifts. The exact stability of the color and/or reflectance will depend on a given application, but the shift of the color with the angle should be less than about 10 C* units, less than about 5 C* units, or less than about 2.5 C* units when the viewing angle is shifted up to about 30°, about 45°, or up to about 60°. The color difference between the hidden and viewing areas should be less than about 7.5 C* units, or less than about 5 C* units or less than about 2.5 C* units. Additionally, a perceived difference in color may be measured by a $\Delta E$ value. Delta E may be defined as a measure of change in visual perception of two given colors and incorporates L* as well as a* and b* where the a* axis represents the green-red component and the b* axis represents the blue-yellow component. The difference or distance between two colors may be defined by the formula:

$$\Delta E = \sqrt{(L^*_0 - L^*_1)^2 + (a^*_0 - a^*_1)^2 + (b^*_0 - b^*_1)^2}$$

A $\Delta E$ less than 1.0 may be not perceptible by human eyes, while a $\Delta E$ of approximately 3 may be detectable at a glance by a casual observer. Accordingly, it is generally contemplated that the $\Delta E$ between the viewing area, or the field of view, and the hidden area, or the perimeter portion, may visibly match such that the $\Delta E$ value is less than about 15 units, less than 10 units, less than 7.5 units, or less than 5 units. According to various examples, particularly where the photochromic lens cover 20 is adjacent to the body panel, the color may be relatively important. For example, the color may be selected to match, or be similar to, the color of the vehicle 12 or to a complementary trim color of the vehicle 12. In other embodiments, the color purity should be very low thereby giving the device a black or colorless appearance. In this case, the color value, or C*, should be less than about 5 units, less than about 2.5 units, or less than about 1 unit.

Figure 3:
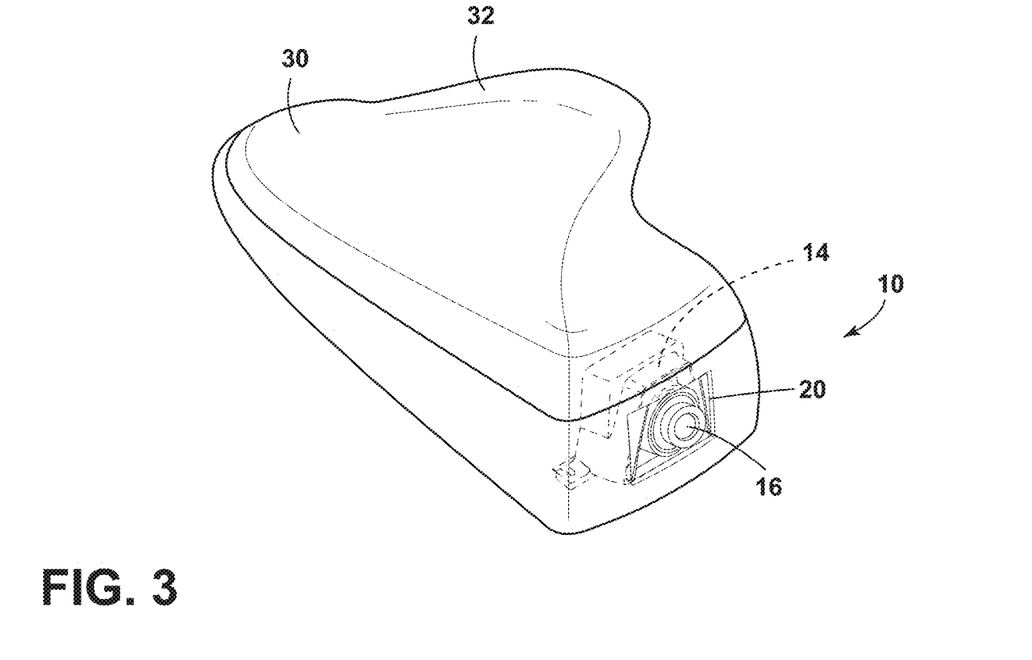
FIG. 3 is a rear top perspective view of the roof mounted antenna and imager module of FIG. 1.
Figure 4:
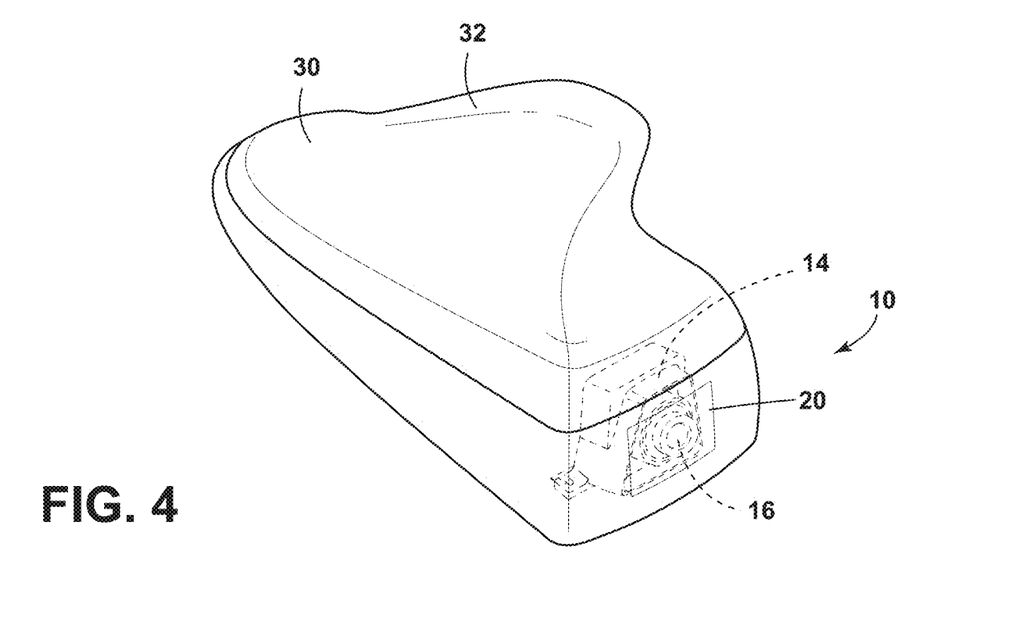
FIG. 4 is a rear top perspective view of the roof mounted antenna and imager module of FIG. 1 with the imager module hidden from view.
Figure 5:
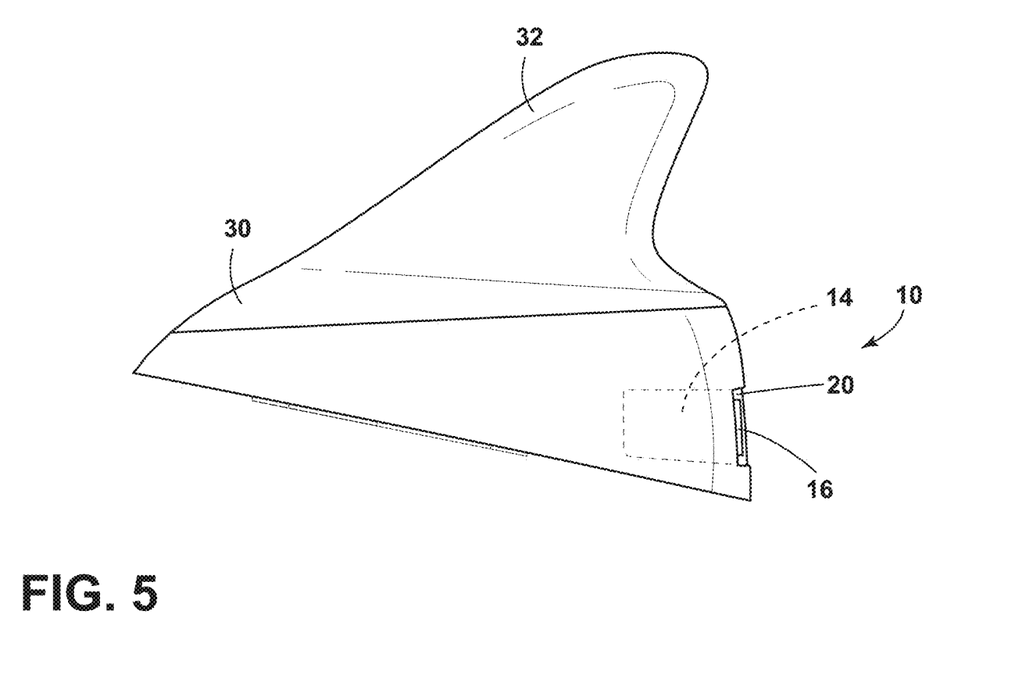
FIG. 5 is a side elevational view of the roof mounted antenna and imager module of FIG. 1.
Figure 6:
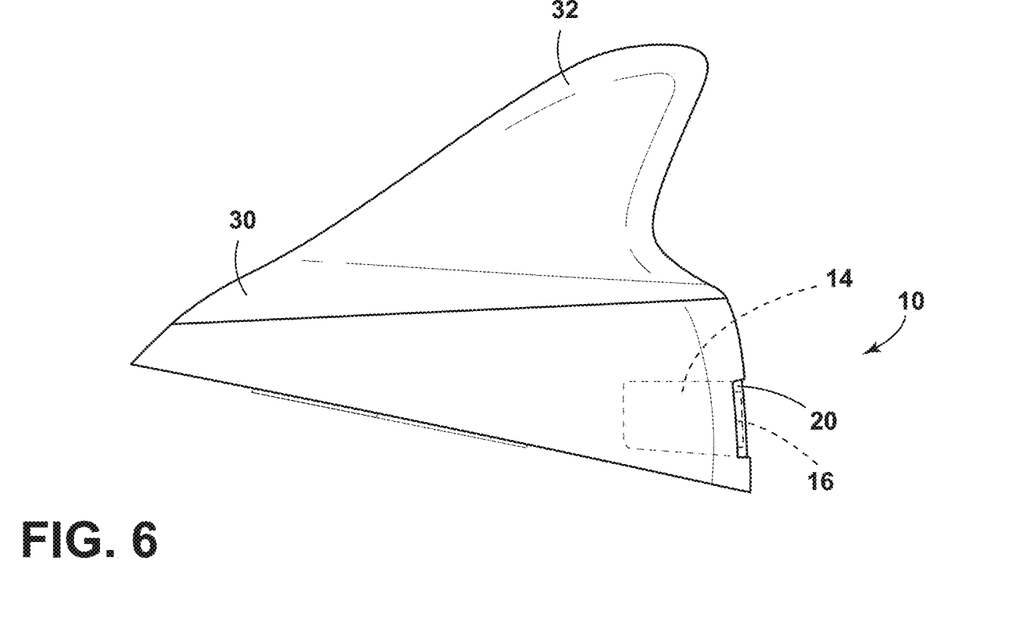
FIG. 6 is a side elevational view of the roof mounted antenna and imager module of FIG. 4 with the imager module hidden from view.
Figure 7:
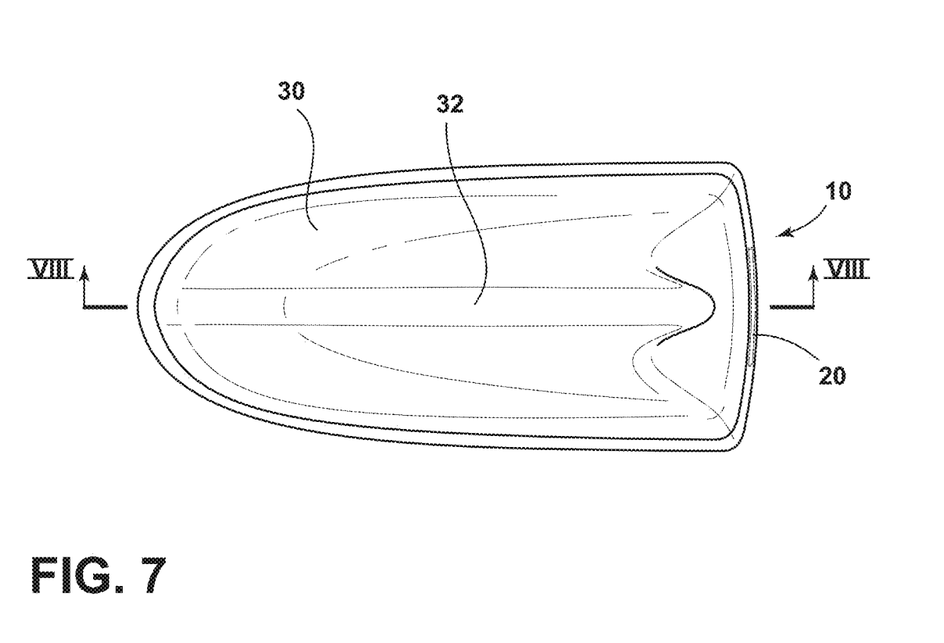
FIG. 7 is a top plan view of the roof mounted antenna and imager module of FIG. 1.

As previously noted, this disclosure generally contemplates use of organic photochromic materials 40 or inorganic photochromic materials 40 to construct the photochromic lens cover 20. The use of a particular type of photochromic material will largely depend on the application and desired performance characteristics. It is generally contemplated that inorganic materials may be used in constructing the photochromic lens cover 20 as inorganic photochromic materials have a high degree of durability. It is also generally contemplated that a silver halide system may be utilized in the photochromic glass of the photochromic lens cover 20. The silver halide system may be configured such that exposure to ultraviolet light causes the silver in the silver halide system to absorb light. The silver halide system may include microcrystalline silver halides (for example, silver chloride). More specifically, photo-sensitive high silica material including photochromic quartz-like glass doped with silver halides may be utilized to provide the desired concealing effects while maintaining some degree of transmissivity as outlined above. Regardless of the photochromic material that is used on the lens cover 20, the photochromic material will generally be configured to darken upon exposure to ultraviolet light of varying intensities (FIGS. 4 and 6). When the photochromic lens cover 20 is not exposed to ultraviolet light, the photochromic lens cover 20 will return to a generally clear state (FIGS. 3 and 5).

Figure 2:
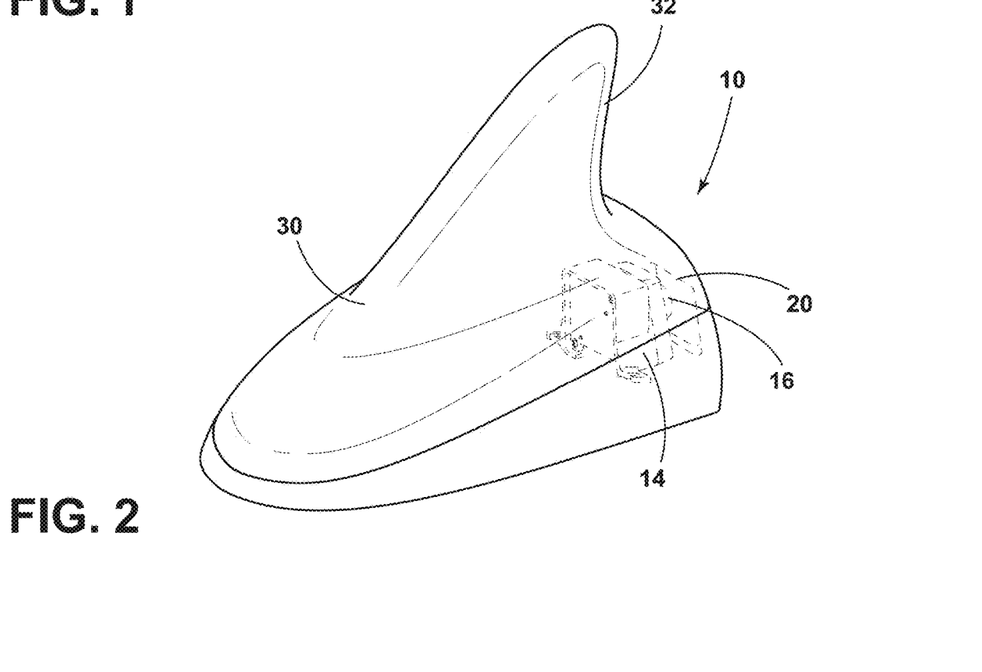
FIG. 2 is a front top perspective view of the roof mounted antenna and imager module of FIG. 1.

With reference again to FIGS. 1-7, the lens cover 20, when in the darkened state, may include photochromic functionality which can absorb, reflect, and/or scatter light, thereby obscuring the visibility of the imager 14. As noted above, the concealing lens cover 20 may be configured as part of an imager cover, or as part of a body panel. In one example, as shown in FIGS. 1 and 2, the lens cover 20 includes the photochromic device positioned within a housing 30 of a vehicle antenna 32. In this instance, the lens cover 20 is disposed proximate the imager lens 16 and conceals the imager lens 16 from view outside of the vehicle 12.

Figure 8:
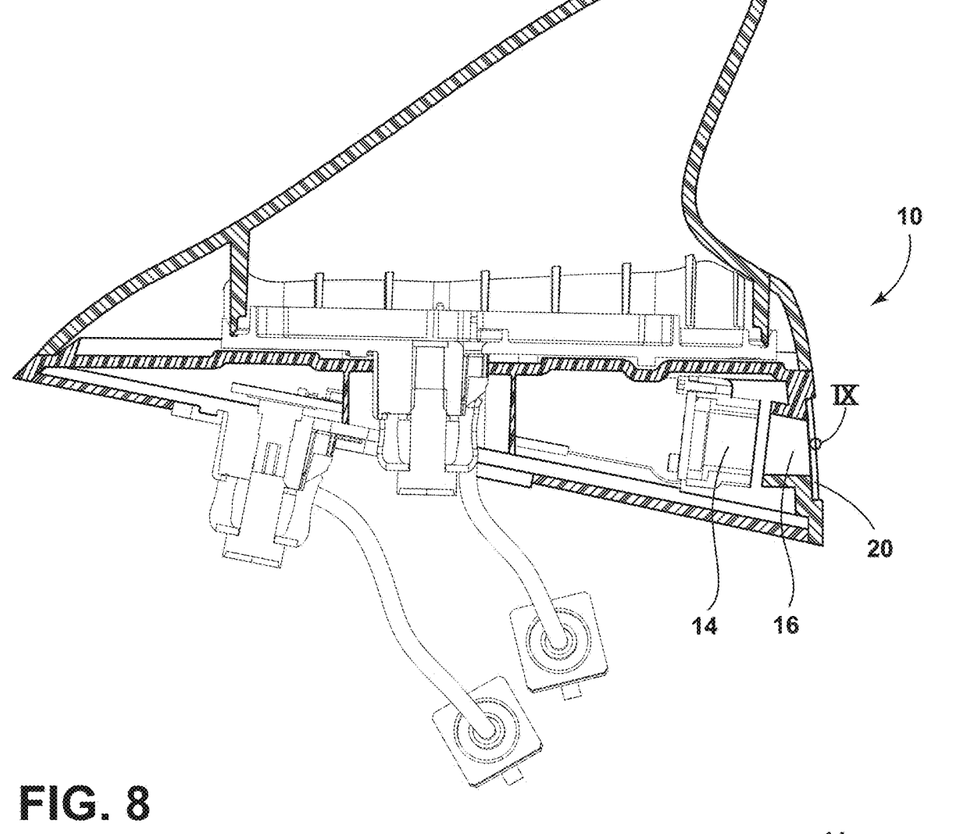
FIG. 8 is a side elevational cross-sectional view of the roof mounted antenna and imager module of FIG. 7 taken at line VIII-VIII.
Figure 9A:
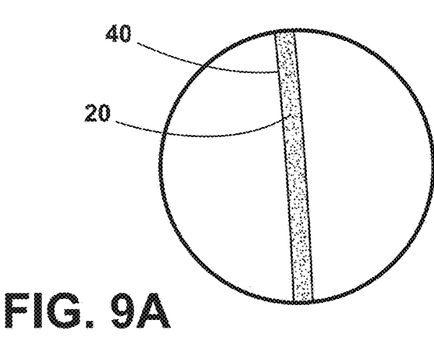
FIG. 9A is a side elevational view of a lens cover with integrated photochromic materials.
Figure 9B:
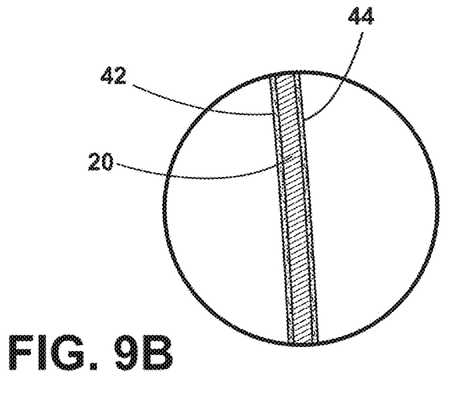
FIG. 9B is a side elevational view of a lens cover with films that include photochromic materials.

With reference to FIGS. 8, 9A, and 9B, an underlying substrate of the photochromic lens cover 20 may be constructed from glass, polycarbonate, plastic, etc. It will be understood that the photochromic material that is applied to the photochromic lens cover 20 may be applied on first and second sides of the lens cover 20 or may be indoctrinated into the substrate of the lens cover 20 such that materials that have photochromic properties are interspersed throughout the photochromic lens cover 20. More specifically, the substrate of the lens cover 20 may be glass, plastic, polycarbonate, etc. with the photochromic materials 40 integrated within all or a portion of the substrate. It is also generally contemplated that one or more films 42, 44 may be applied to a glass substrate of a photochromic lens cover 20 (FIG. 9B). Plastic photochromic lens covers may incorporate organic photochromic materials. In addition, plastic photochromic lens covers may include oxazines or naphthopyrans, or both. Regardless of the material choice, the photochromic lens cover 20 may be planar or have curvature in one or more directions across the photochromic lens cover 20.

It is generally contemplated that the photochromic lens cover 20 may darken generally rapidly (for example, in less than one minute) upon exposure to light, however, the rate may vary depending on the application. It is also contemplated that the lens cover 20 may clear upon removal of ultraviolet light at a similar rate to the darkening.

Generally rapid response time for clearing and darkening is desirable as a vehicle can transition from a darkened area (a parking garage) to a natural light area (an open road) relatively quickly. As noted above, it is generally contemplated that the imager 14 may be configured to operate in both the clear state and darkened state. In addition, it will be understood that the term "clear state" as set forth herein is generally interchangeable with the term "substantially transmissive state" and that the photochromic lens cover 20 will be substantially clear in this condition. In addition, in a darkened state, the transmissivity will be less than the clear state, although the photochromic lens cover 20 may not be completely opaque or completely darkened.

The imager 14 may include the ability to see through the darkened photochromic material during the day. At night when high transmission is desirable, the photochromic material may be clear. When the vehicle 12 is parked, during daylight, the imager 14 will be concealed. At night, there is little or no need to conceal the imager 14 because the imager 14 will not be seen when the ambient light is dark. The imager 14 will have the light sensitivity to capture a good image even with less than 15% of the typical light that is available during daylight hours or in a well-lit area (i.e., highway, city, etc.) when the photochromic lens cover 20 is fully darkened.

A problem associated with rendering the image data 22 that is captured by the imager 14 and provided on a display of in or on the vehicle may occur when the object being imaged contains an amplitude-modulated (AM) light source. An example of an AM light source is one which is pulsing on/off at some periodic rate, like a vehicle lamp assembly constructed with light emitting diodes (LEDs), where the LEDs are pulse-width-modulated (PWM). The PWM period and duty cycle in such lamp assemblies may result in the LEDs being turned on and off at some periodic rate. Due to the periodic activation (e.g. on/off periods), the imager 14 used to capture the image data 22 of such a lamp assembly may capture successive images where the LEDs may be 'on' in one or more consecutive images, and then 'off' in one or more subsequent images.

For most AM light sources, a human directly observing the AM light source will not perceive any flicker in the 'on/off' pattern, since the frequency of the on/off pattern is higher than the human vision system can perceive (PWM LED headlamp/tail-lamp assemblies being a prime example). However, when capturing the image data 22 of an object that includes an AM light source, the AM light source may result in one or more pixels of an imager array accumulating light when the AM light source is inactive. Such an unsynchronized capture of the image data representing the AM light source may result in some images being displayed showing a pixel representing the AM light source to be in an 'on' state and successive images showing the pixel to be in an 'off' state. In these conditions, the AM light source may be consistently active but modulated at a frequency that creates a flickering effect in the image data 22. Accordingly, when displaying the image data 22 at some display frame rate, the display system may present a human observer an 'on/off' pattern that is discernible as a 'flickering' light.

It is generally contemplated that during daylight hours, the photochromic lens cover 20, when in the fully darkened state, may allow a longer integration time for the imager 14 to capture the image data 22, thereby mitigating, or in some instances, completely eliminating, any perceived flickering effect that may be caused by the collection of the image data 22 of an object with an AM light source that utilizes, for example, PWM LEDs that may be present in taillights of another vehicle, streetlights, signage, etc. Thus, when image data is captured by the imager through the photochromic lens cover 20 and provided on a display within or on the vehicle 12, any flicker that may have been otherwise noticeable by a user will be minimized or eliminated. Stated differently, the photochromic lens cover lessens flicker associated with image data captured by the imager when the imager is proximate a pulse-width modulated light source. There are several benefits associated with utilizing a photochromic lens cover 20 to mitigate flickering. The photochromic lens cover 20 does not utilize electrical contacts or vehicle power and therefore no electrical current to the photochromic lens cover 20 to darken or lighten the photochromic lens cover 20. The photochromic lens cover 20 operates solely based on external lighting conditions. In addition, the photochromic lens cover 20 darkens uniformly across the entirety of the photochromic lens cover 20, instead of edge to center darkening as is sometimes the case in powered dimming devices including electrochromic devices that may utilize and electrical current to darken or lighten. Therefore, flickering will be uniformly eliminated, rather than flickering being mitigated at edges of the captured image data, but not at a center of the captured image data. In addition to flicker mitigation, the higher transmissivity of the photochromic lens cover 20, for example, when the photochromic lens cover 20 is in the generally clear state, allows for the collection of clearer image data 22 during evening hours or in poorly lit environments.

The imager and photochromic lens cover 20 may utilize an imaging processing unit operably coupled with the imager 14, such as that set forth in U.S. Pat. No. 10,412,312, entitled "SYSTEM AND METHOD FOR PROCESSING VIDEO DATA TO DETECT AND ELIMINATE FLICKERING LIGHT SOURCES THROUGH DYNAMIC EXPOSURE CONTROL" the contents of which are incorporated herein by reference in their entirety. The imaging processing unit may be utilized in processing image data collected by the imager 14 through the photochromic lens cover 20 before being provided on a display visible to a user.

It is also contemplated that a film that includes a photochromic dye may be disposed one or more surfaces of first and second glass substrates, first and second polycarbonate substrates, or between a polycarbonate substrate and a glass substrate. The relative thickness of the glass substrate and the polycarbonate substrate may vary relative to one another, but the overall assembly will be generally thin to provide a lightweight viewing solution through a panel of a vehicle or through an antenna cover. In those instances where a film is applied to one or more surfaces of the lens cover 20, the layer may include a uniform thickness of between 50 and 250 micro millimeters.

Figure 10:
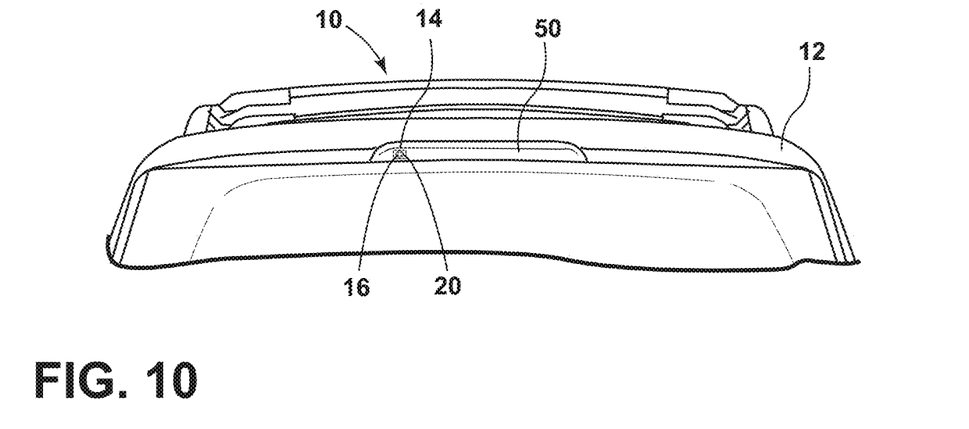
FIG. 10 is a front perspective view of a rear center high mount stop light of a vehicle having a cover disposed over an imager of the present disclosure.
Figure 11:
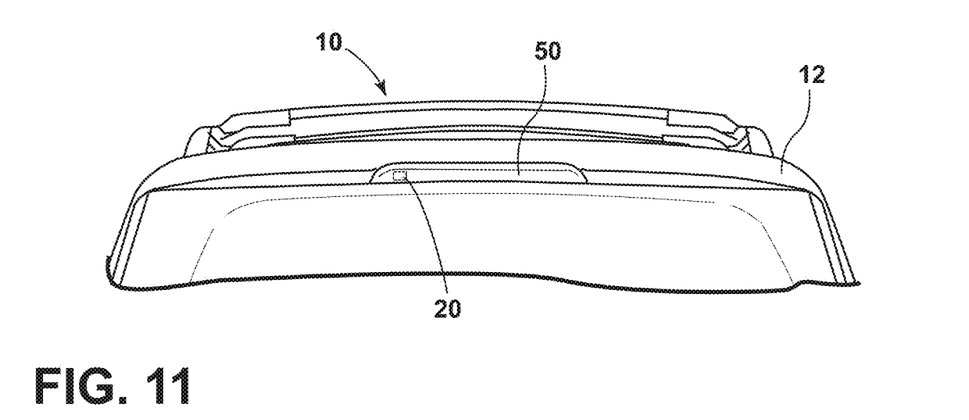
FIG. 11 is another front perspective view of the rear center high mount stop light of a vehicle having a cover disposed over an imager of the present disclosure.
Figure 12:
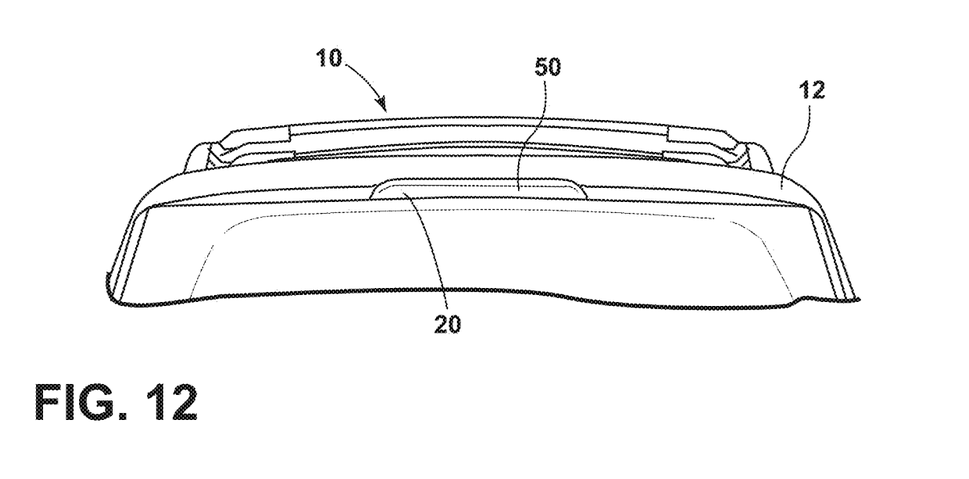
FIG. 12 is another front perspective view of the rear center high mount stop light of a vehicle having a cover disposed over an imager of the present disclosure.

With reference now to FIGS. 10-12, in the illustrated embodiment, a top portion of the vehicle 12 is illustrated having the CHMSL 50. The imager 14 is disposed behind the lens cover 20 formed as part of the CHMSL 50. The imager 14 is configured to collect the image data 22 from behind the vehicle 12. The lens cover 20 may be configured to conceal the imager lens 16 by darkening (via the manners disclosed above), such that the imager lens 16 is not visible from outside of the vehicle 12. In the darkened state, the lens cover 20 will appear as a dark square on the body panel or CHMSL 50 of the vehicle 12. Alternatively, as shown in FIG. 12, the lens cover 20 can be configured to appear to have a color tone that matches or nearly matches the color tone of the paint of the body panel or CHMSL 50 of the vehicle 12.

Figure 13:
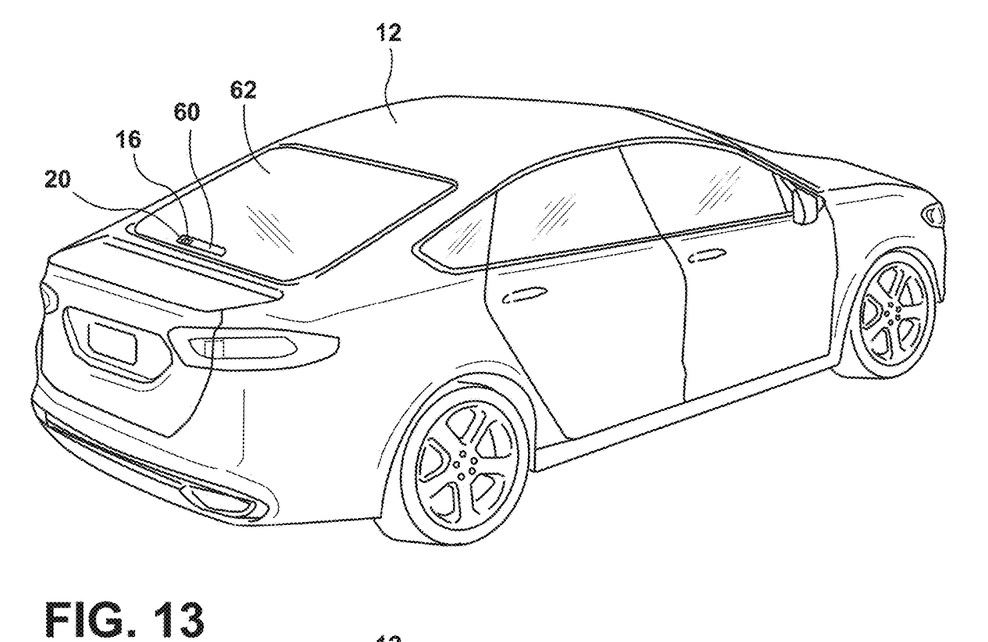
FIG. 13 is a rear elevational view of a vehicle with a brake light including a photochromic lens cover extending over an imager module.
Figure 14:
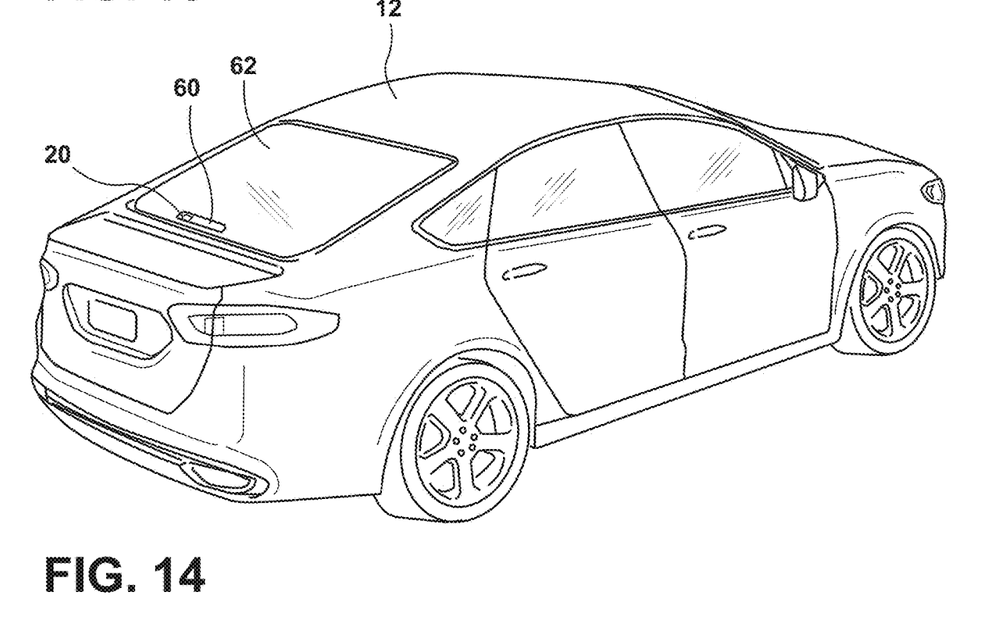
FIG. 14 is a rear elevational view of a vehicle with a brake light including a photochromic lens cover extending over an imager module.
Figure 15:
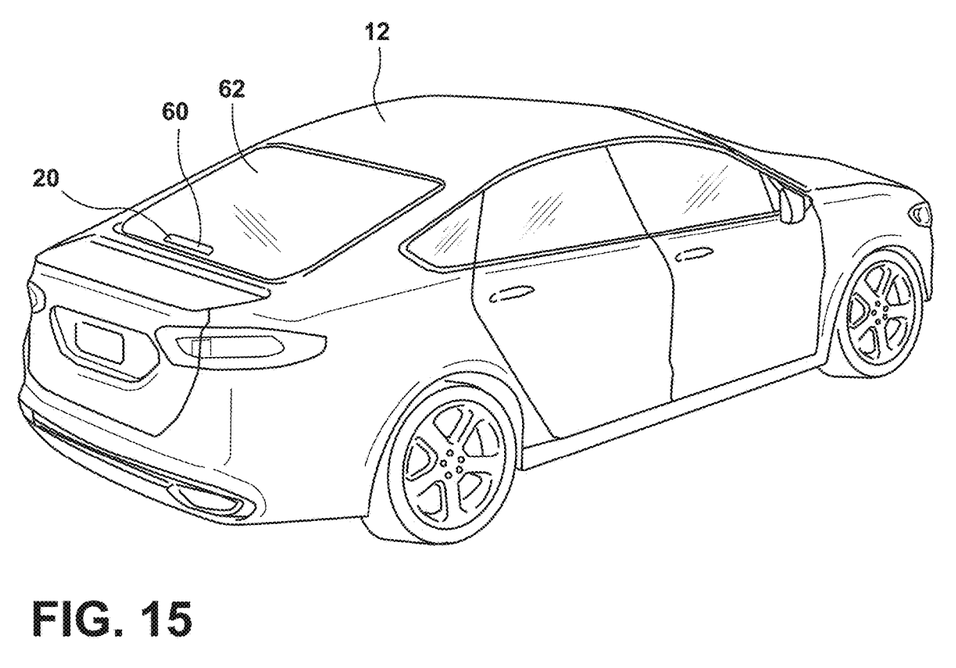
FIG. 15 is another rear elevational view of a vehicle with a brake light including a photochromic lens cover extending over an imager module.

In a similar fashion, as shown in FIGS. 13-15, the imager 14 can also be used in or on a brake light 60 of the vehicle

12. In this instance, the imager 14 collects the image data 22 through a rear windshield 62 of the vehicle 12. In an undarkened deactivated state, the imager 14 may be visible, as shown in FIG. 13. However, upon activation of the concealment device, which may be any of those set forth above, the imager lens 16 may be hidden from view by the lens cover 20, which may appear as a darkened area on the brake light 60. Alternatively, as shown in FIG. 15, the darkened state may be configured to match closely with the general color (red) of the brake light 60, such that the imager 14 is generally not observable, nor is the lens cover 20 readily discernible relative to its surroundings. It is contemplated that the photochromic lens cover 20 may be part of an active system with ultraviolet light-emitting diodes (LEDs) as part of the system. In an artificially lit area, the photochromic lens cover 20 may not darken significantly due to the absence of ultraviolet radiation. Artificial light may make it possible to see the imager 14 since the photochromic lens cover 20 would not darken or would darken only minimally.

According to one aspect of the present disclosure, a concealing device for an imager of a vehicle includes a photochromic lens cover with an external surface that is co-extensive with an adjacent portion of the vehicle and disposed proximate a lens of the imager. The photochromic lens cover is operable between a first condition wherein the photochromic lens cover is exposed to ultraviolet light and darkens to a transmissivity of less than 15% and a second condition wherein the photochromic lens cover includes a transmissivity of greater than 50%.

According to another aspect of the present disclosure, a photochromic lens cover lessens flicker of image data captured by an imager.

According to another aspect of the present disclosure, a photochromic lens cover is disposed adjacent a window of a vehicle.

According to yet another aspect of the present disclosure, a photochromic lens cover is integrally formed as part of a body panel of a vehicle.

According to still another aspect of the present disclosure, a photochromic lens cover defines at least a portion of a housing of a vehicle antenna.

According to still another aspect of the present disclosure, an imager module for a vehicle includes an imager that has an imager lens. The imager is configured to collect image data from at least one of inside and outside of the vehicle. A photochromic lens cover is disposed proximate the imager lens and is operable between a first condition wherein the photochromic lens cover is in a darkened state and lessens perceived flicker associated with image data captured by the imager and provided on a display and a second condition wherein the photochromic lens cover includes a transmissivity of greater than 50%.

According to yet another aspect of the present disclosure, a photochromic lens cover darkens to below 15% transmissivity when in a darkened state.

According to another aspect of the present disclosure, a photochromic lens cover darkens upon exposure to ultraviolet light.

According to another aspect of the present disclosure, a photochromic lens cover includes microcrystals of silver halide that form elemental silver when exposed to ultraviolet light.

According to yet another aspect of the present disclosure, a photochromic lens cover visibly matches a body panel of a vehicle.

According to still another aspect of the present disclosure, an imager module for a vehicle includes an imager that has an imager lens. The imager is configured to collect image data from at least one of inside and outside of the vehicle. A photochromic lens cover is disposed proximate the imager lens and includes a substrate with photochromic materials interspersed therein. The photochromic lens cover is operable between a first condition wherein the photochromic lens cover is in a darkened state and a second condition wherein the photochromic lens cover is in a substantially transmissive state.

According to another aspect of the present disclosure, a photochromic lens cover includes a transmissivity of greater than 50% when in a transmissive state.

According to still another aspect of the present disclosure, a photochromic lens cover darkens uniformly across a surface area of a photochromic lens.

According to yet another aspect of the present disclosure, a photochromic lens cover lessens flicker associated with image data captured by an imager when the imager is proximate a pulse-width modulated light source.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A concealing device for an imager of a vehicle comprising: a photochromic lens cover having an external surface that is co-extensive with and integrally formed as part of a body panel of said vehicle and disposed proximate a lens of said imager, wherein a transmissivity is higher at a central portion of the photochromic lens cover and lower at a periphery of the photochromic lens cover, the photochromic lens cover operable between:
   a first condition wherein the photochromic lens cover is exposed to ultraviolet light and darkens to a transmissivity of less than 15%; and
   a second condition wherein the photochromic lens cover includes a transmissivity of greater than 50%.

2. The concealing device of claim 1, wherein the photochromic lens cover lessens flicker of image data captured by said imager.

3. The concealing device of claim 1, wherein the photochromic lens cover is disposed adjacent a window of said vehicle.

4. The concealing device of claim 1, wherein the photochromic lens cover is integrally formed as part of a body panel of said vehicle.

5. An imager module for a vehicle comprising:
   an imager including an imager lens, the imager being configured to collect image data from at least one of inside and outside said vehicle; and
   a photochromic lens cover disposed proximate the imager lens, wherein a transmissivity is higher at a central portion of the photochromic lens cover and lower at a periphery of the photochromic lens cover, the photochromic lens cover being operable between:
      a first condition wherein the photochromic lens cover is in a darkened state and lessens perceived flicker associated with image data captured by the imager and provided on a display; and
      a second condition wherein the photochromic lens cover includes a transmissivity of greater than 50%.

6. The imager module of claim 5, wherein the photochromic lens cover darkens to below 15% transmissivity when in the darkened state.

7. The imager module of claim 5, wherein the photochromic lens cover darkens upon exposure to ultraviolet light.

8. The imager module of claim 5, wherein the photochromic lens cover includes microcrystals of silver halide that form elemental silver when exposed to ultraviolet light.

9. The imager module of claim 5, wherein the photochromic lens cover is integrally formed as part of a body panel of said vehicle.

10. The imager module of claim 5, wherein the photochromic lens cover defines at least a portion of a housing of a vehicle antenna.

11. The imager module of claim 5, wherein the photochromic lens cover visibly matches a body panel of said vehicle.

12. An imager module for a vehicle comprising: an imager including an imager lens, the imager being configured to collect image data from at least one of inside and outside said vehicle; and
   a photochromic lens cover disposed proximate the imager lens, wherein the photochromic lens cover includes a substrate, wherein the substrate is tinted to substantially match a tint of an adjacent window of said vehicle such that a difference or distance between two colors ($\Delta E$ value) is less than 5 chromatic ($C^*$) units, the substrate including photochromic materials interspersed therein, the photochromic lens cover being operable between:
      a first condition wherein the photochromic lens cover is in a darkened state; and
      a second condition wherein the photochromic lens cover is in a substantially transmissive state.

13. The imager module of claim 12, wherein the photochromic lens cover darkens to below 15% transmissivity when in the darkened state.

14. The imager module of claim 12, wherein the photochromic lens cover includes a transmissivity of greater than 50% when in the transmissive state.

15. The imager module of claim 12, wherein the photochromic lens cover darkens upon exposure to ultraviolet light.

16. The imager module of claim 12, wherein the photochromic lens cover includes microcrystals of silver halide that form elemental silver when exposed to ultraviolet light.

17. The imager module of claim 12, wherein the photochromic lens cover darkens uniformly across a surface area of the photochromic lens.

18. The imager module of claim 12, wherein the photochromic lens cover defines at least a portion of a housing of a vehicle antenna.

19. The imager module of claim 12, wherein the photochromic lens cover lessens flicker associated with image data captured by the imager when the imager is proximate a pulse-width modulated light source.

* * * * *